United States Patent
Ochiishi

(10) Patent No.: US 10,527,844 B2
(45) Date of Patent: Jan. 7, 2020

(54) CAMERA COVER DEVICE, MONITOR CAMERA SYSTEM, AND ROBOT SYSTEM

(71) Applicant: FANUC CORPORATION, Yamanashi (JP)

(72) Inventor: Yoshinori Ochiishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/008,651

(22) Filed: Jun. 14, 2018

(65) Prior Publication Data
US 2018/0364476 A1 Dec. 20, 2018

(30) Foreign Application Priority Data
Jun. 19, 2017 (JP) ................................ 2017-119606

(51) Int. Cl.
| | |
|---|---|
| *G03B 17/48* | (2006.01) |
| *G02B 27/00* | (2006.01) |
| *G03B 17/02* | (2006.01) |
| *H04N 5/225* | (2006.01) |

(52) U.S. Cl.
CPC ......... *G02B 27/0006* (2013.01); *G03B 17/02* (2013.01); *H04N 5/2252* (2013.01)

(58) Field of Classification Search
USPC ....................................................... 396/429
See application file for complete search history.

(56) References Cited

U.S. PATENT DOCUMENTS

| | | | | |
|---|---|---|---|---|
| 5,394,208 A | * | 2/1995 | Campbell | G03B 29/00 |
| | | | | 348/E5.026 |
| 7,522,834 B2 | * | 4/2009 | Heaven | G01N 21/15 |
| | | | | 348/373 |
| 8,137,009 B2 | * | 3/2012 | Cirker | G08B 13/19634 |
| | | | | 396/427 |
| 9,857,444 B2 | * | 1/2018 | Kwak | G01R 33/4215 |
| 2013/0062228 A1 | * | 3/2013 | Danilov | G02B 27/0006 |
| | | | | 206/216 |
| 2014/0218601 A1 | * | 8/2014 | Munoz | H04N 5/2251 |
| | | | | 348/373 |

(Continued)

FOREIGN PATENT DOCUMENTS

| | | |
|---|---|---|
| CN | 106027869 A | 10/2016 |
| JP | 2001108880 | 4/2001 |

(Continued)

OTHER PUBLICATIONS

Japanese Office Action dated Oct. 23, 2018, for Japanese Patent Application No. 2017-119606.

(Continued)

*Primary Examiner* — Rodney E Fuller
(74) *Attorney, Agent, or Firm* — Karceski IP Law, PLLC

(57) ABSTRACT

A camera cover device includes a casing accommodating a camera that acquires an image or a video and having an opening in front of a lens of the camera; a cover capable of opening and closing the opening of the casing; an air cylinder that drives the cover in opening and closing directions; and a purge mechanism that supplies air at least to a closed space formed between the lens of the camera and the cover when the cover is closed so as to set the pressure in the closed space higher than the pressure outside the casing.

7 Claims, 4 Drawing Sheets

(56) References Cited

U.S. PATENT DOCUMENTS

| | | | | |
|---|---|---|---|---|
| 2015/0185592 A1* | 7/2015 | Eineren | ............... | G03B 17/02 |
| | | | | 348/375 |
| 2017/0230548 A1* | 8/2017 | Costa | ............... | H04N 5/2252 |
| 2018/0160016 A1* | 6/2018 | Yamane | ............... | B25J 19/04 |

FOREIGN PATENT DOCUMENTS

| | | |
|---|---|---|
| JP | 2003232975 | 8/2003 |
| JP | 2010175639 | 8/2010 |
| JP | 2013085204 A | 5/2013 |
| JP | 2016218325 | 12/2016 |
| TW | 201710774 A | 3/2017 |

OTHER PUBLICATIONS

Chinese Office Action dated Jun. 19, 2019, for Chinese Patent Application No. 201810614704.6.

\* cited by examiner

CAMERA COVER DEVICE, MONITOR CAMERA SYSTEM, AND ROBOT SYSTEM

CROSS-REFERENCE TO RELATED APPLICATIONS

This United States Patent Application relies for priority and is based on Japanese Patent Application No. 2017-119606, filed on Jun. 19, 2017, the entire content of which is incorporated herein by reference.

FIELD OF THE INVENTION

The present invention relates to camera cover devices, monitor camera systems, and robot systems.

BACKGROUND OF THE INVENTION

In a known configuration in the related art, cameras installed in manufacturing sites for manufacturing products are equipped with camera covers for preventing dust and dirt from adhering to the lenses of the cameras (for example, see Japanese Unexamined Patent Application, Publication No. 2016-218325).

Such a camera cover includes a housing having an upper opening, a lid attached to the housing and used for opening and closing the opening of the housing, and an air blower that blows air upward when the lid is open. With such a camera cover, dust and dirt are prevented from entering the housing when the lid is closed. When the lid is open, air is blown upward from the air blower so that dust and dirt are prevented from entering the housing through the opening and are thus prevented from adhering to the lens of the camera.

SUMMARY OF THE INVENTION

The present invention provides the following solutions.

An aspect of the present invention provides a camera cover device comprising: a casing accommodating a camera that acquires an image or a video and having an opening in front of a lens of the camera; a cover capable of opening and closing the opening of the casing; a cover driving mechanism that drives the cover in opening and closing directions; and a purge mechanism that supplies air at least to a closed space formed between the lens of the camera and the cover when the cover is closed so as to set the pressure in the closed space higher than the pressure outside the casing.

Another aspect of the present invention provides a monitor camera system comprising: the camera cover device described above; and a camera accommodated in the casing.

Another aspect of the present invention provides a robot system comprising: the monitor camera system described above; and a work robot that operates based on a preset computer program.

DESCRIPTION OF EMBODIMENT(S) OF THE INVENTION

A camera cover device 10, a monitor camera system 3, and a robot system 1 according to an embodiment of the present invention will be described below with reference to the drawings.

Figure 1:
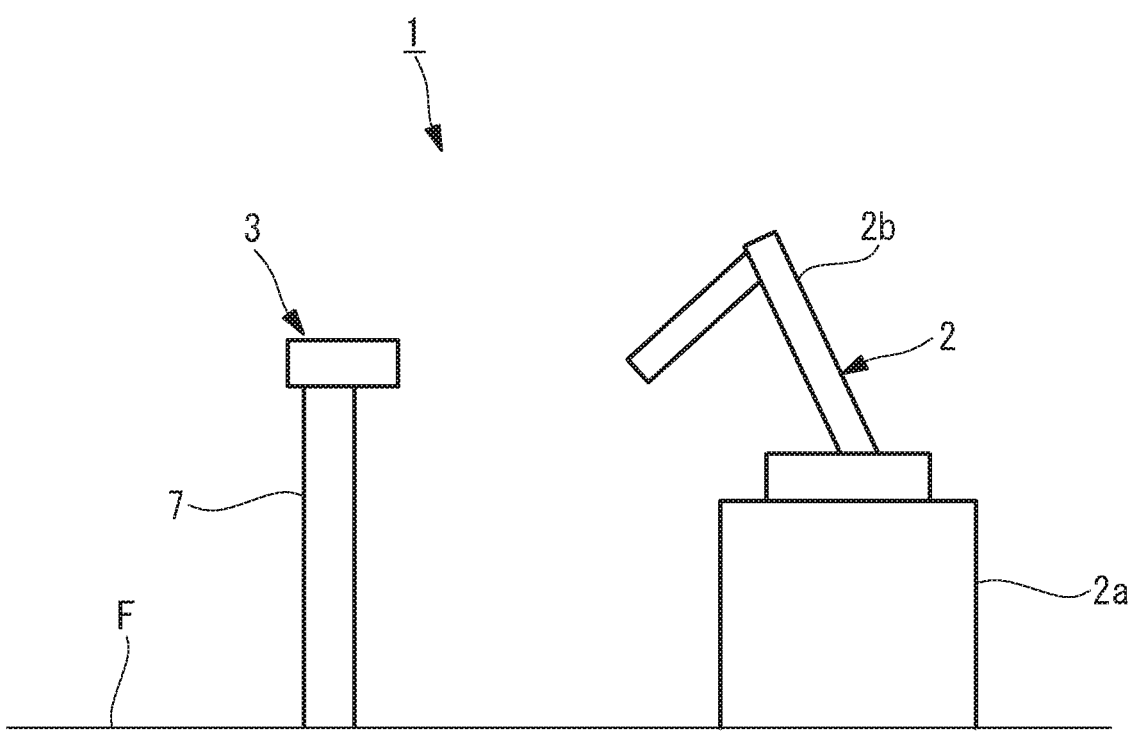
FIG. 1 illustrates the overall configuration of a robot system according to an embodiment of the present invention.

As shown in FIG. 1, the robot system 1 according to this embodiment includes a work robot 2 and the monitor camera system 3.

The work robot 2 executes predetermined operations based on a preset computer program. The work robot 2 includes a base 2a provided on a floor surface F and a multiaxial articulated arm 2b provided on the base 2a.

Figure 2:
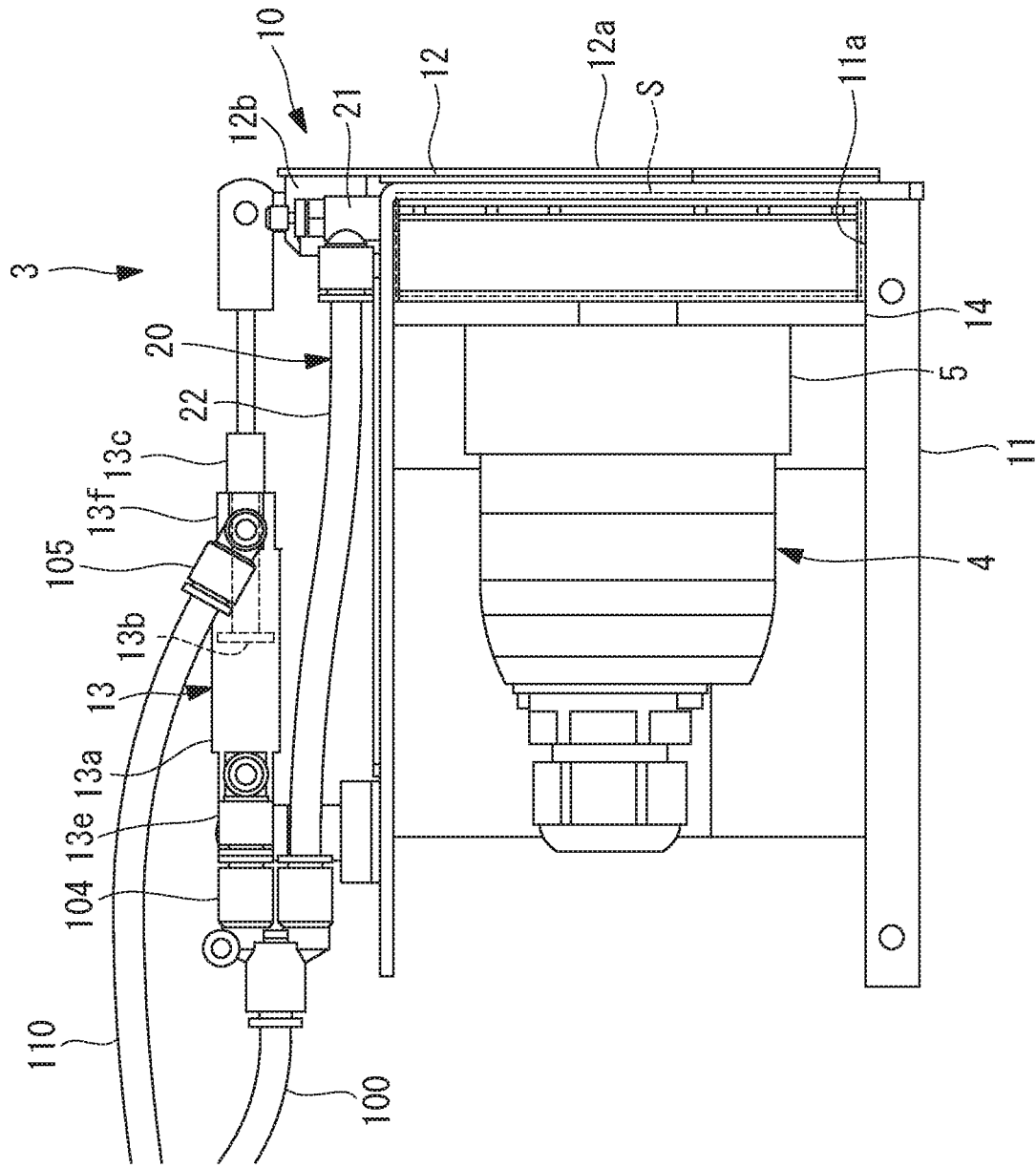
FIG. 2 is a cross-sectional view illustrating a monitor camera system included in the robot system in FIG. 1.

The monitor camera system 3 according to this embodiment monitors, for example, the operation of the work robot 2 and a workpiece (not shown) to be operated by the work robot 2. The monitor camera system 3 is provided on a base 7 provided on the floor surface F. As shown in FIG. 2, the monitor camera system 3 includes the camera cover device 10 and a camera 4 that acquires an image or a video.

The camera cover device 10 according to this embodiment includes a casing 11, a cover 12, an air cylinder (cover driving mechanism) 13, and a purge mechanism 20.

The casing 11 is fixed on the base 7 (see FIG. 1) and accommodates the camera 4 that acquires an image or a video. The casing 11 has an opening 11a in front of a lens 5 of the camera 4. Although the lens 5 of the camera 4 and the opening 11a are oriented in the horizontal direction in this embodiment, the direction in which they are oriented is not limited to this direction.

A lens cover 14 having optical transparency is disposed in the opening 11a of the casing 11, and the lens 5 of the camera 4 is covered by the lens cover 14. The lens cover 14 is formed of, for example, an acrylic-resin plate material having a predetermined thickness.

The cover 12 is provided such that it is capable of opening and closing the opening 11a of the casing 11. The cover 12 has a plate-like cover body 12a that blocks the opening 11a and a hinge 12b provided at the upper end of the cover body 12a and rotatably connected to the upper surface of the casing 11.

The air cylinder 13 drives the cover 12 in opening and closing directions. The air cylinder 13 extends in a front-rear direction that connects the front side (i.e., the right side in FIG. 2), which is the side of the camera 4 where the lens 5 is provided, and the rear side (i.e., the left side in FIG. 2) opposite from the side of the camera 4 where the lens 5 is provided.

The air cylinder 13 includes a tubular cylinder 13a, a piston 13b movable within the cylinder 13a along the central axis of the cylinder 13a, and a rod 13c one end of which is fixed to the piston 13b and that protrudes forward from the cylinder 13a. The piston 13b moves along the central axis within the cylinder 13a so that the rod 13c protrudes from and retracts into the cylinder 13a, whereby the overall length of the air cylinder 13 increases and decreases. The distal end of the rod 13c is connected to the hinge 12b of the cover 12.

The air cylinder 13 is connected to an expansion air supply duct (cylinder duct) 100 and a contraction air supply duct (cylinder duct) 110 for expanding and contracting the air cylinder 13.

One end of the expansion air supply duct 100 is connected to an air supply source (not shown), such as a facility air supply or an air compressor. The other end of the expansion air supply duct 100 is connected, by means of a branch joint 104, to a base end 13$e$ located at the opposite side from the rod 13$c$ relative to the piston 13$b$ in the cylinder 13$a$ of the air cylinder 13.

One end of the contraction air supply duct 110 is connected to the air supply source (not shown). The other end of the contraction air supply duct 110 is connected, by means of a connection joint 105 (see FIG. 3), to a distal end 13$f$ located at the same side as the rod 13$c$ relative to the piston 13$b$ in the cylinder 13$a$ of the air cylinder 13.

Figure 3:
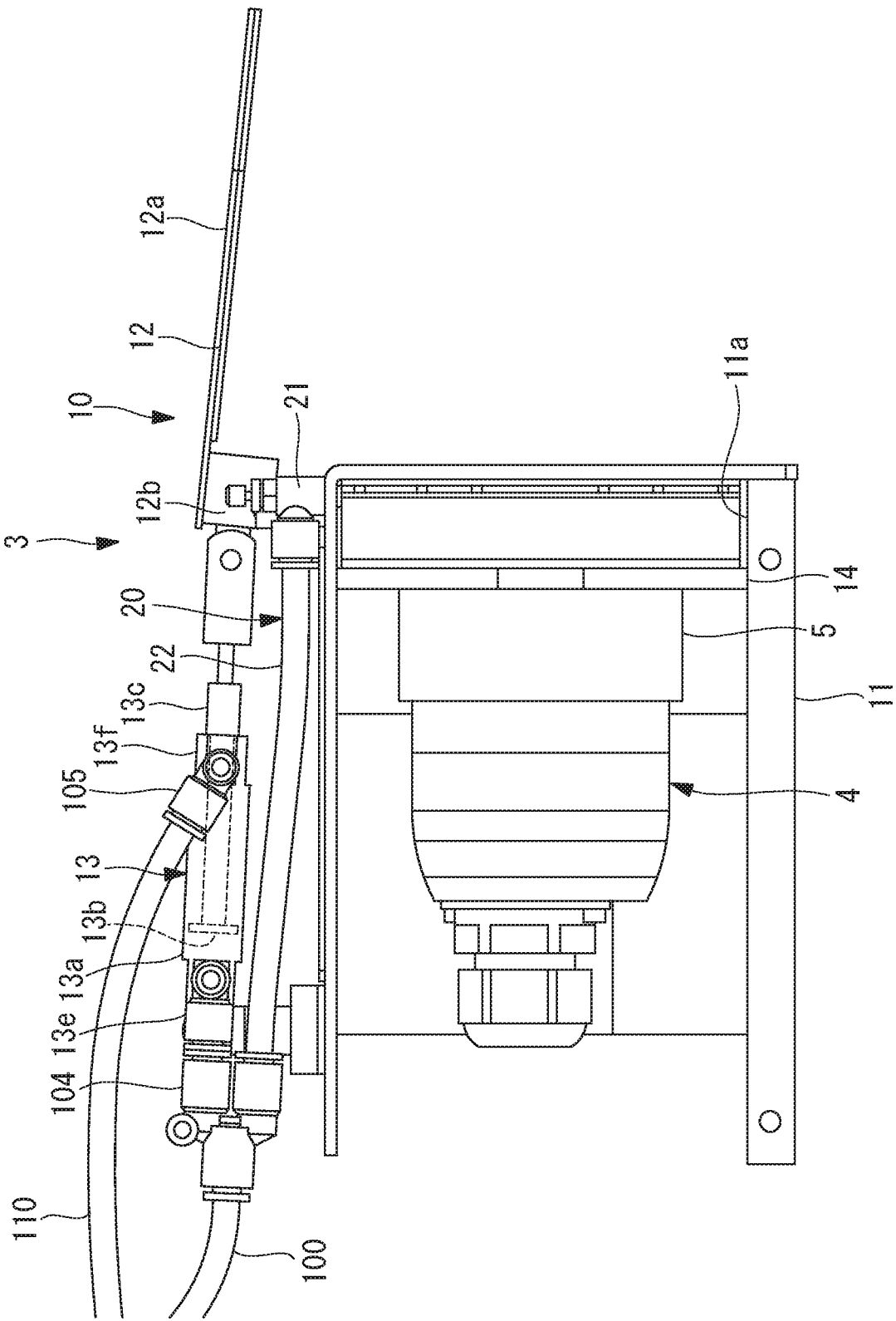
FIG. 3 is a cross-sectional view illustrating a state where a cover of a camera cover device of the monitor camera system in FIG. 2 is open.

In the air cylinder 13, when air fed from the air supply source (not shown) is supplied into the cylinder 13$a$ via the contraction air supply duct 110, the pressure of the supplied air causes the piston 13$b$ to move toward the base end 13$e$ within the cylinder 13$a$. This causes the rod 13$c$ to move and retract into the cylinder 13$a$, as shown in FIG. 3, so that the distal end of the rod 13$c$ pulls the hinge 12$b$ of the cover 12, thereby rotating the cover 12 in the opening direction.

Furthermore, in the air cylinder 13, when air fed from the air supply source (not shown) is supplied into the cylinder 13$a$ via the expansion air supply duct 100, the pressure of the supplied air causes the piston 13$b$ to move toward the distal end 13$f$ within the cylinder 13$a$. This causes the rod 13$c$ to move and protrude out from the cylinder 13$a$, as shown in FIG. 2, so that the distal end of the rod 13$c$ pushes the hinge 12$b$ of the connected cover 12, thereby rotating the cover 12 in the closing direction.

When the cover 12 is closed, the purge mechanism 20 supplies air into a closed space S formed between the lens cover 14 and the cover 12 so that the pressure in the closed space S becomes higher than the pressure outside the casing 11. The purge mechanism 20 includes a purge duct 22 and a throttle valve 21.

The purge duct 22 is connected to the branch joint 104 provided at the expansion air supply duct 100. The branch joint 104 distributes air fed from the expansion air supply duct 100 to the air cylinder 13 and the purge duct 22. The distal end of the purge duct 22 is connected to the throttle valve 21. In this embodiment, the purge duct 22 has an inner diameter that is equal to the inner diameter of the expansion air supply duct 100.

The throttle valve 21 has a throttle section (not shown) having an inner diameter smaller than the inner diameter of the purge duct 22. The throttle valve 21 is attached to the outer surface of the casing 11 and spatially communicates with the closed space S formed within the casing 11 between the lens cover 14 and the cover 12.

In the purge mechanism 20, a portion of air flowing through the expansion air supply duct 100 is fed to the purge duct 22 via the branch joint 104. The air fed to the purge duct 22 is supplied to the closed space S via the throttle valve 21. When the closed space S is supplied with the air, the pressure in the closed space S becomes higher than the pressure outside the casing 11.

Next, the operation of the monitor camera system 3 in the above-described robot system 1 will be described.

The monitor camera system 3 uses the camera 4 to acquire an image or a video so as to monitor, for example, the operation of the work robot 2 and the state of a workpiece operated by the work robot 2. The monitor camera system 3 sets the cover 12 of the camera cover device 10 in an opened state (see FIG. 3) only when an image or a video is to be acquired using the camera 4, but otherwise sets the cover 12 in a closed state (see FIG. 2). The opening-closing operation of the cover 12 is controlled by a controller (not shown) that controls the overall operation of the robot system 1.

When the cover 12 is to be opened, air from the air supply source (not shown) is fed to the contraction air supply duct 110 in accordance with a command from the controller (not shown). The air fed to the contraction air supply duct 110 is supplied into the cylinder 13$a$ of the air cylinder 13. This causes the rod 13$c$ to move and retract into the cylinder 13$a$, as shown in FIG. 3, so that the distal end of the rod 13$c$ pulls the hinge 12$b$ of the cover 12, thereby rotating the cover 12 in the opening direction to an opened state.

After the cover 12 is opened, the camera 4 acquires an image or a video in accordance with a command from the controller (not shown), so that, for example, the operation of the work robot 2 and the state of the workpiece operated by the work robot 2 are monitored.

After a predetermined monitoring process is completed, the cover 12 is closed in accordance with a command from the controller (not shown). In order to achieve this, air is fed from the air supply source (not shown) to the expansion air supply duct 100. The air fed to the expansion air supply duct 100 is supplied into the cylinder 13$a$ of the air cylinder 13. This causes the rod 13$c$ to move and protrude out from the cylinder 13$a$, thereby rotating the cover 12 in the closing direction.

In this case, when the supplying of the air to the expansion air supply duct 100 starts, a portion of the supplied air is simultaneously fed to the purge duct 22 via the branch joint 104. Because the flow resistance in the purge duct 22 is set to be larger than the flow resistance in the expansion air supply duct 100 by the throttle valve 21 provided in the purge mechanism 20, the air fed from the air supply source (not shown) during the closing operation of the cover 12 (i.e., during the expanding operation of the air cylinder 13) mainly flows into the expansion air supply duct 100 so as to be used for the expanding operation of the air cylinder 13, that is, the rotating operation of the cover 12 in the closing direction.

As the closing operation of the cover 12 caused by the expanding operation of the air cylinder 13 continues, the cover 12 moves to a predetermined position so as to be set in a closed state, as shown in FIG. 2.

Subsequently, as the supplying of the air to the expansion air supply duct 100 from the air supply source continues, the air cylinder 13 no longer receives the supplied air since the piston 13$b$ has reached the stroke end at the distal end 13$f$ within the cylinder 13$a$. Then, the air flows more toward the purge duct 22 at the branch joint 104. The air flowing into the purge duct 22 is supplied to the closed space S via the throttle valve 21, so that the pressure in the closed space S becomes higher than the pressure outside the casing 11. Consequently, this prevents particulates, such as mist and micro powder existing in the atmosphere surrounding the camera cover device 10, from entering the closed space S from outside the casing 11.

Accordingly, in the camera cover device 10, the monitor camera system 3, and the robot system 1 according to this embodiment, when the cover 12 is closed, air is supplied to the closed space S by the purge mechanism 20, so that the pressure in the closed space S is set to be higher than the pressure outside the casing 11. Consequently, when the cover 12 is closed, particulates, such as mist and micro powder, are prevented from entering the closed space S from outside the casing 11 and adhering to the lens 5.

Therefore, particulates, such as mist and micro powder, can be prevented from adhering to the lens 5 when the camera 4 is not being used. Thus, the lens 5 of the camera 4 can be prevented from being soiled, while the camera 4 can perform an image or video acquisition process with clear visibility. As a result, the reliability of the monitor camera system 3 can be enhanced. Furthermore, the work robot 2 can perform work while the monitor camera system 3 performs a monitoring process more reliably with clear visibility.

Moreover, the purge mechanism 20 is configured to supply air to the closed space S between the lens cover 14 and the cover 12. This can prevent particulates, such as mist and micro powder, from entering the closed space S from outside the casing 11 and adhering to the lens 5.

In the purge mechanism 20, a portion of air flowing through the expansion air supply duct 100 is supplied to the purge duct 22 branching off from the expansion air supply duct 100. Accordingly, since air is supplied to the closed space S by the purge mechanism 20, it is not necessary to provide, for example, a pipe leading to the purge mechanism 20 from the air supply source in addition to the expansion air supply duct 100 that supplies air to the air cylinder 13. Therefore, the purge duct 22 of the purge mechanism 20 may simply have a length equal to that of the segment branching off from the expansion air supply duct 100, so that the work involved in attaching a pipe and the cost for providing a pipe can be reduced.

Furthermore, the purge duct 22 branches off from the expansion air supply duct 100 that supplies air to the air cylinder 13 when the cover 12 is to be driven in the closing direction. Accordingly, when air is supplied to the expansion air supply duct 100, a portion of the air flows into the purge duct 22, so that the air is supplied to the closed space S. By supplying air to the air cylinder 13 in this manner when the cover 12 is to be driven in the closing direction, the air is automatically fed to the purge duct 22. This eliminates the need to provide a control valve that controls the flow of air for supplying air to the purge duct 22, thereby reducing the work and the cost involved in attaching such a control valve.

Furthermore, the purge duct 22 is provided with the throttle valve 21, so that the flow resistance of the purge duct 22 is increased. In the process of changing the cover 12 from an opened state to a closed state, a portion of the air flowing through the expansion air supply duct 100 flows into the purge duct 22, but since the flow resistance of the purge duct 22 is increased by the throttle valve 21, a larger amount of air flows toward the air cylinder 13.

Therefore, the operation of the air cylinder 13 is reliable, and the cover 12 can be closed quickly. After the cover 12 is closed, the air cylinder 13 does not move any further, so that the air flows more toward the purge duct 22 having the large flow resistance. This causes a larger amount of air to be supplied to the closed space S, so that the pressure in the closed space S can be quickly set to be higher than the pressure outside the casing 11. Consequently, without having to use a control valve that controls the air to be supplied to the purge duct 22, the air is made to flow preferentially toward the air cylinder 13 when the cover 12 is to be closed, and is made to flow preferentially toward the purge mechanism 20 after the cover 12 is closed.

Although the purge mechanism 20 is provided with the throttle valve 21 in the above-described embodiment, the configuration is not limited to this.

Figure 4:
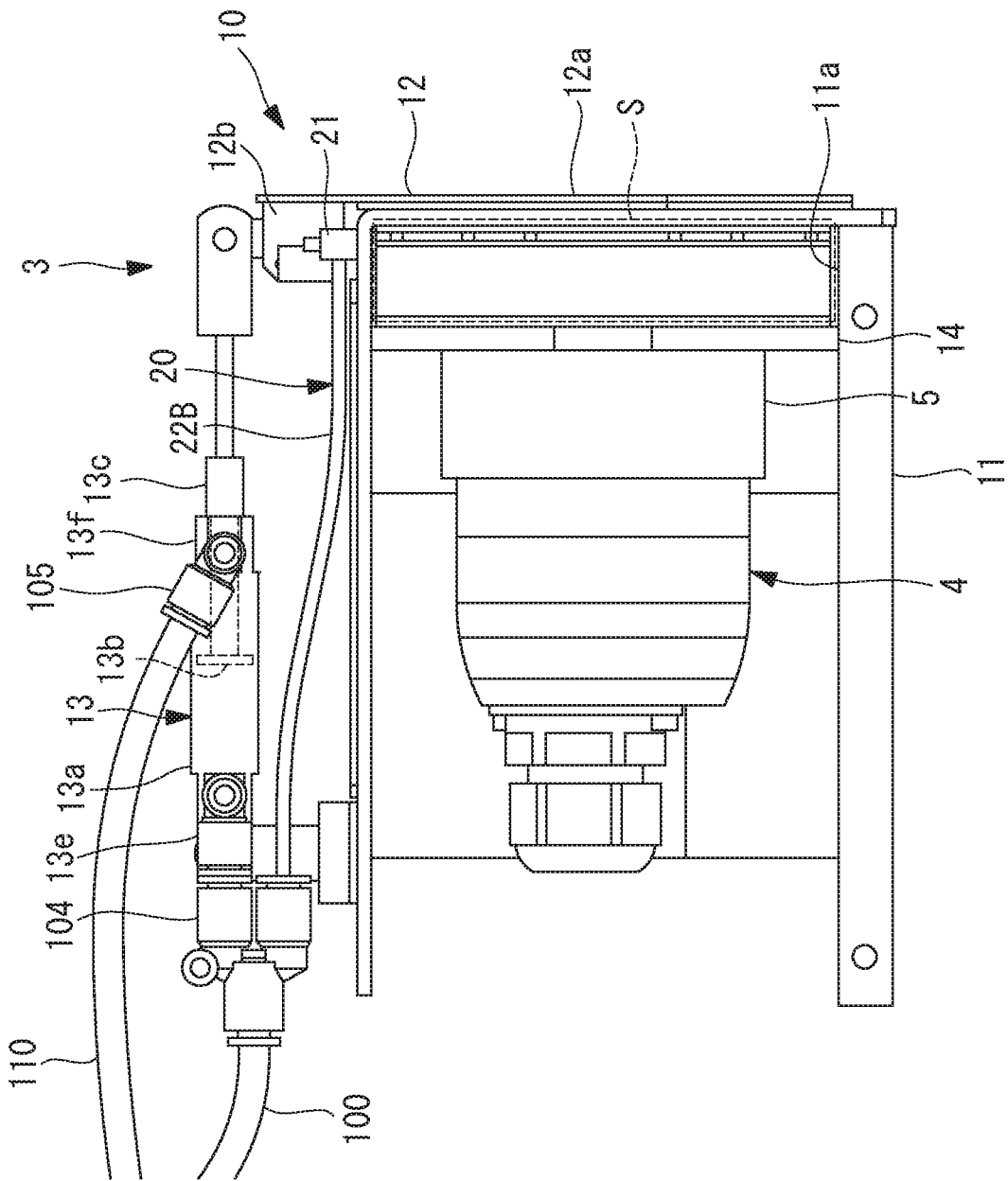
FIG. 4 is a cross-sectional view illustrating the configuration of a monitor camera system according to a modification of the embodiment of the present invention.

For example, as shown in FIG. 4, the throttle valve 21 may be omitted, and the inner diameter of a purge duct 22B may be set to be smaller than the inner diameter of the expansion air supply duct 100.

Accordingly, the flow resistance of the purge duct 22B is increased. In the process of changing the cover 12 from an opened state to a closed state in such a configuration, a portion of the air flowing through the expansion air supply duct 100 flows into the purge duct 22B, but since the flow resistance of the purge duct 22B having the small inner diameter is increased, a larger amount of air flows toward the air cylinder 13. Therefore, the operation of the air cylinder 13 is reliable, and the cover 12 can be closed quickly.

After the cover 12 is closed, the air cylinder 13 does not move any further, so that the air flows more toward the purge duct 22 having the large flow resistance. This causes a larger amount of air to be supplied to the closed space S, so that the pressure in the closed space S can be quickly set to be higher than the pressure outside the casing 11. Consequently, without having to use the throttle valve 21, the air is made to flow preferentially toward the air cylinder 13 when the cover 12 is to be closed, and is made to flow preferentially toward the purge mechanism 20 after the cover 12 is closed, as in the above-described embodiment.

Alternatively, a control valve, the opening-closing operation of which is controlled by the controller (not shown), may be provided in place of the throttle valve 21. The opening and closing of the control valve may be controlled so as to supply air to the closed space S only when the cover 12 is closed.

Although the lens cover 14 is provided in the above-described embodiment, the present invention is also effective in a configuration not having the lens cover 14.

Furthermore, for example, instead of supplying air to the closed space S between the lens cover 14 and the cover 12, the purge mechanism 20 may supply air between the lens 5 of the camera 4 and the cover 12 or into the entire interior space of the casing 11 of the camera cover device 10.

Moreover, although the purge mechanism 20 is configured to supply air to the closed space S, the purge mechanism 20 may supply another type of gas, such as inert gas including nitrogen gas or argon gas, as purge gas in place of air.

As a result, the above-described embodiment leads to the following aspects.

An aspect of the present invention provides a camera cover device comprising: a casing accommodating a camera that acquires an image or a video and having an opening in front of a lens of the camera; a cover capable of opening and closing the opening of the casing; a cover driving mechanism that drives the cover in opening and closing directions; and a purge mechanism that supplies air at least to a closed space formed between the lens of the camera and the cover when the cover is closed so as to set the pressure in the closed space higher than the pressure outside the casing.

According to this aspect, the purge mechanism supplies air at least to the closed space formed between the lens of the camera and the cover when the cover is closed so as to set the pressure in the closed state higher than the pressure outside the casing. Consequently, when the cover is closed, particulates, such as mist and micro powder, can be prevented from entering the closed space from outside the casing and adhering to the lens.

In the above aspect, a lens cover having optical transparency and covering the lens may be provided in the opening, and wherein the purge mechanism may supply the air to the closed space formed between the lens cover and the cover.

Accordingly, in the case where the lens cover is provided, the air is supplied between the lens cover and the cover so that particulates, such as mist and micro powder, can be prevented from entering the space between the lens cover and the cover from outside the casing.

In the above aspect, the cover driving mechanism may include an air cylinder driven in an expanding-contracting manner by air supplied from an external source via a cylinder duct, and wherein the purge mechanism may include a purge duct branching off from the cylinder duct and supplying a portion of air flowing through the cylinder duct to the closed space.

Accordingly, in the purge mechanism, a portion of the air flowing through the cylinder duct is supplied to the purge duct branching off from the cylinder duct. Consequently, since air is supplied to the closed space by the purge mechanism, it is not necessary to provide, for example, a pipe leading to the purge mechanism from an air supply source in addition to the cylinder duct that supplies air to the air cylinder. Therefore, the purge duct of the purge mechanism may simply have a length of the segment branching off from the cylinder duct, so that the work involved in attaching a pipe and the cost for providing a pipe can be reduced.

In the above aspect, the purge duct may branch off from the cylinder duct that supplies air to the air cylinder when the cover is to be driven in the closing direction.

Accordingly, when air is supplied to the cylinder duct that supplies air to the air cylinder when the cover is to be driven in the closing direction, the cover changes from an opened state to a closed state. Then, a portion of the air flowing through the cylinder duct flows into the purge duct, so that the air is supplied to the closed space between the lens of the camera and the cover. By supplying air to the air cylinder in this manner when the cover is to be driven in the closing direction, the air is automatically fed to the purge duct after the cover is closed. This eliminates the need to provide a control valve that controls the flow of air for supplying air to the purge duct, thereby reducing the work and the cost involved in attaching such a control valve.

In the above aspect, the purge duct may include a throttle valve.

By providing the throttle valve in this manner, the flow resistance of the purge duct is increased. In the process of changing the cover from an opened state to a closed state in such a configuration, a portion of the air flowing through the cylinder duct flows into the purge duct, but since the flow resistance of the purge duct is increased by the throttle valve, a larger amount of air flows toward the air cylinder. Therefore, the operation of the air cylinder is reliable, and the cover can be closed quickly. After the cover is closed, the air cylinder does not move any further, so that the air flows more toward the purge duct having the large flow resistance. This causes a larger amount of air to be supplied to the closed space between the lens of the camera and the cover, so that the pressure in the closed space can be quickly set to be higher than the pressure outside the casing. Consequently, without having to use a control valve that controls the air to be supplied to the purge duct, the air can be made to flow preferentially toward the air cylinder when the cover is to be closed, and can be made to flow preferentially toward the purge mechanism after the cover is closed.

In the above aspect, wherein the purge duct may have a smaller inner diameter than the cylinder duct.

Accordingly, the flow resistance of the purge duct is increased. In the process of changing the cover from an opened state to a closed state in such a configuration, a portion of the air flowing through the cylinder duct flows into the purge duct, but the flow resistance of the purge duct having the small inner diameter is increased, a larger amount of air flows toward the air cylinder. Therefore, the operation of the air cylinder is reliable, and the cover can be closed quickly. After the cover is closed, the air cylinder does not move any further, so that the air flows more toward the purge duct having the large flow resistance. This causes a larger amount of air to be supplied to the closed space, so that the pressure in the closed space can be quickly set to be higher than the pressure outside the casing. Consequently, without having to use a control valve that controls the air to be supplied to the purge duct, the air can be made to flow preferentially toward the air cylinder when the cover is to be closed, and can be made to flow preferentially toward the purge mechanism after the cover is closed.

Another aspect of the present invention provides a monitor camera system comprising: the camera cover device described above; and a camera accommodated in the casing.

According to this aspect, particulates, such as mist and micro powder, can be prevented from entering the casing from outside the casing and adhering to the lens when the cover is closed. Thus, the lens of the camera can be prevented from being soiled, while the camera can perform an image or video acquisition process with clear visibility. As a result, the reliability of the monitor camera system can be enhanced.

Another aspect of the present invention provides a robot system comprising: the monitor camera system described above; and a work robot that operates based on a preset computer program.

According to this aspect, particulates, such as mist and micro powder, can be prevented from entering the casing from outside the casing and adhering to the lens when the cover is closed. Thus, the lens of the camera can be prevented from being soiled, while still allowing the camera to perform an image or video acquisition process with clear visibility. As a result, the work robot can perform work while the monitor camera system performs a monitoring process more reliably with clear visibility.

The present invention is advantageous in that particulates, such as mist and micro powder, can be prevented from adhering to a lens when a camera is not being used.

The invention claimed is:

1. A camera cover device comprising:
   a casing for a camera that acquires an image or a video and having an opening in front of a lens of the camera;
   a cover configured to open and close the opening of the casing;
   a cover driving mechanism that drives the cover in opening and closing directions; and
   a purge mechanism that supplies air at least to a closed space formed between the lens of the camera and the cover when the cover is closed so as to set the pressure in the closed space higher than the pressure outside the casing,
   wherein the cover driving mechanism includes an air cylinder driven in an expanding-contracting manner by air supplied from an external source via a cylinder duct, and
   wherein the purge mechanism includes a purge duct branching off from the cylinder duct and supplying a portion of air flowing through the cylinder duct to the closed space.

2. The camera cover device according to claim 1,
   wherein a lens cover having optical transparency and covering the lens is provided in the opening, and
   wherein the purge mechanism supplies the air to the closed space formed between the lens cover and the cover.

3. The camera cover device according to claim 1,
wherein the purge duct branches off from the cylinder duct that supplies air to the air cylinder when the cover is to be driven in the closing direction.

4. The camera cover device according to claim 1,
wherein the purge duct includes a throttle valve.

5. The camera cover device according to claim 1,
wherein the purge duct has a smaller inner diameter than the cylinder duct.

6. A monitor camera system comprising:
the camera cover device according to claim 1; and
a camera accommodated in the casing.

7. A robot system comprising:
the monitor camera system according to claim 6; and
a work robot that operates based on a preset computer program.

\* \* \* \* \*